R. P. MITCHELL & R. V. BRAWLEY.
DAMPER REGULATOR.
APPLICATION FILED JUNE 4, 1908.
935,390.
Patented Sept. 28, 1909.
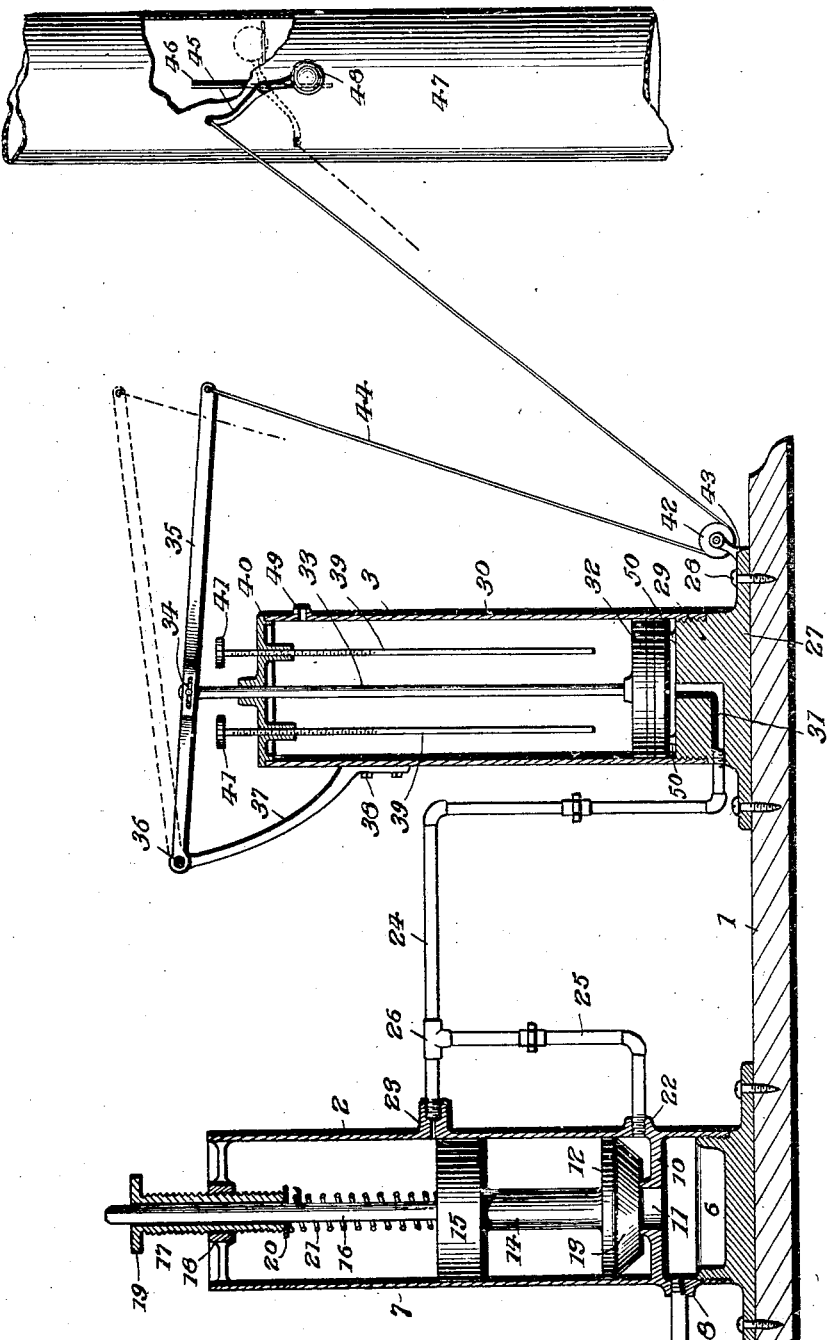
WITNESSES
L. H. Schmidt
C. E. Trainor
INVENTORS
Richard P. Mitchell,
Robert V. Brawley,
BY Munn & Co
ATTORNEYS

UNITED STATES PATENT OFFICE.

RICHARD PAGE MITCHELL AND ROBERT VANCE BRAWLEY, OF STATESVILLE, NORTH CAROLINA.

DAMPER-REGULATOR.

935,390.  Specification of Letters Patent.  Patented Sept. 28, 1909.

Application filed June 4, 1908. Serial No. 436,616.

*To all whom it may concern:*

Be it known that we, RICHARD P. MITCHELL and ROBERT V. BRAWLEY, citizens of the United States, and residents of Statesville, in the county of Iredell and State of North Carolina, have invented certain new and useful Improvements in Damper - Regulators, of which the following is a specification.

Referring to the drawings forming a part hereof the figure is a sectional view of the improvement shown applied to the damper.

The present embodiment of our invention comprises a support 1, of suitable size and material having secured near each end thereof, cylinders 2, 3, the cylinder 2 being connected with the boiler, and the cylinder 3 being connected with the cylinder 2 in a manner to be presently described.

The cylinder comprises a base 4 secured to the support 1 by screws 5, and having a cylindrical portion 6 onto which is threaded the cylindrical casing 7. Near its lower end the casing is provided with a nipple 8, into which is threaded the steam inlet pipe 9, and above the nipple within the cylinder is a valve seat formed by a diaphragm 10 in the cylinder having a central flanged opening 11.

A valve consisting of a disk 12 beveled toward its lower end as at 13 coöperates with the seat to close the opening and the disk 12 is connected by a reduced portion 14 with a second disk 15, and a rod 16 extends upwardly from the disk through a nipple 17 which is threaded through a spider 18 in the open end of the cylindrical casing 7. The upper end of the nipple 17 is provided with a milled flange 19, for convenience in manipulating the same, and at its lower end it engages a washer 20, and between the washer and the disk 15 is arranged a coil spring 21, normally acting to retain the disks in lower position whereby to close the steam inlet.

A nipple 22 is arranged above the diaphragm 10, and a second nipple 23 is arranged above the disk 15 when it is in its lowermost position, and threaded into the nipple 23 is a pipe 24 communicating with the lower portion of the cylinder 3, and a second pipe 25 is threaded into the nipple 22, and communicates with the pipe 24 as at 26.

The cylinder 3 comprises a base 27 connected to the support by screws 28, and having a cylindrical threaded portion 29, under which is threaded the cylindrical casing 30 of the cylinder. A passage 31 leads from the pipe 24 to the center of the cylindrical portion 29, and a piston 32 is slidable in the cylinder, the said piston being provided with a stem 33 having a lost motion connection as at 34 with a lever 35 which is hinged as at 36 to a bracket 37, secured to the cylinder as at 38.

Rods 39 are threaded through the top 40 of the cylinder, for limiting the upward movement of the piston, and the free ends of the rod are provided with milled heads 41, for convenience in manipulating the same. A pulley 42 is secured to the base as at 43, and a cord 44 leads from the free end of the lever 35, under the pulley and to an arm 45 connected with the trunnion of the damper 46, which is pivoted in the stack 47 in the usual manner. A weight 48 is also connected with the trunnion, the weight acting to normally retain the damper in the open position shown in Fig. 1.

In operation, the spring 21 is adjusted to retain the disk 12 in the position shown in Fig. 1, against a predetermined pressure in the boiler. It will be noticed that when the disk 12 is in this position, the disk 15 is in such position, that the inlet opening of the pipe 24 is uncovered, thus permitting the cylinder 3 to exhaust. Should however, the pressure exceed the predetermined value, the disks 12, 15 will be elevated, thus permitting the steam to pass through the pipe 25 and the pipe 24 to the cylinder 3, where it acts on the piston 32 elevating the same, which through its connection with the damper closes or partially closes the same in accordance with the excess of pressure. When the valve 12 is so elevated the disk 15 closes the inlet opening of the pipe 24, but when the pressure falls and the disk 12 drops, such inlet opening is uncovered permitting the cylinder 3 to exhaust, and the piston 32 to again move downwardly, whereby to permit the weight to swing the damper into the open position.

The closing of the damper may be regulated by the rods 39, and an opening 49 is provided in the cylinder 3, whereby to permit the air to escape above the piston.

It will be understood that the steam inlet pipe, to the cylinder 3 leads from the boiler, (not shown) and the stack 47 is the stack of the furnace which heats the boiler.

We claim:

1. The combination with a counterbalanced damper, of a regulator therefor, comprising a cylinder, a piston within the cylinder, a bracket on the cylinder, an arm having one end pivoted to the bracket and the other connected with the damper, a rod connecting the piston with the arm, rods threaded through the top of the cylinder and extending thereinto for engaging the piston to limit the upward movement thereof, said rods being provided with milled heads for convenience in manipulating the same, a second cylinder open at its top and provided at its bottom with an inlet for fluid under pressure, a disk valve movable in the cylinder and normally closing the inlet, a second disk valve arranged above the first and rigidly connected therewith, a spring normally retaining said valves in lowermost position, means for regulating the tension of the spring, a pipe connecting the last named with the first named cylinder, said pipe opening below the first named disk, and a by-pass leading from the pipe to the cylinder and opening above the first disk when in lowermost position.

2. The combination with the counterbalanced damper, of a fluid operated piston for moving the damper, a cylinder in which the piston moves, and means for controlling the admission of the fluid to the cylinder, said means comprising a second cylinder open at its top and provided at its bottom with an inlet for fluid under pressure, a disk valve movable in the cylinder and normally closing the inlet, a second disk valve arranged above the first and rigidly connected therewith, a spring normally retaining said valves in lowermost position, means for regulating the tension of the spring, a pipe connecting the last named with the first named cylinder, said pipe opening between the first named disk, and a by-pass leading from the pipe to the cylinder and opening above the first disk when in lowermost position.

RICHARD PAGE MITCHELL.
ROBERT VANCE BRAWLEY.

Witnesses:
O. L. TURNER,
R. O. MILLER.